W. H. RIPLEY.
WEIR OVERFLOW FOR EVAPORATORS.
APPLICATION FILED MAY 17, 1917.
1,361,905.
Patented Dec. 14, 1920.
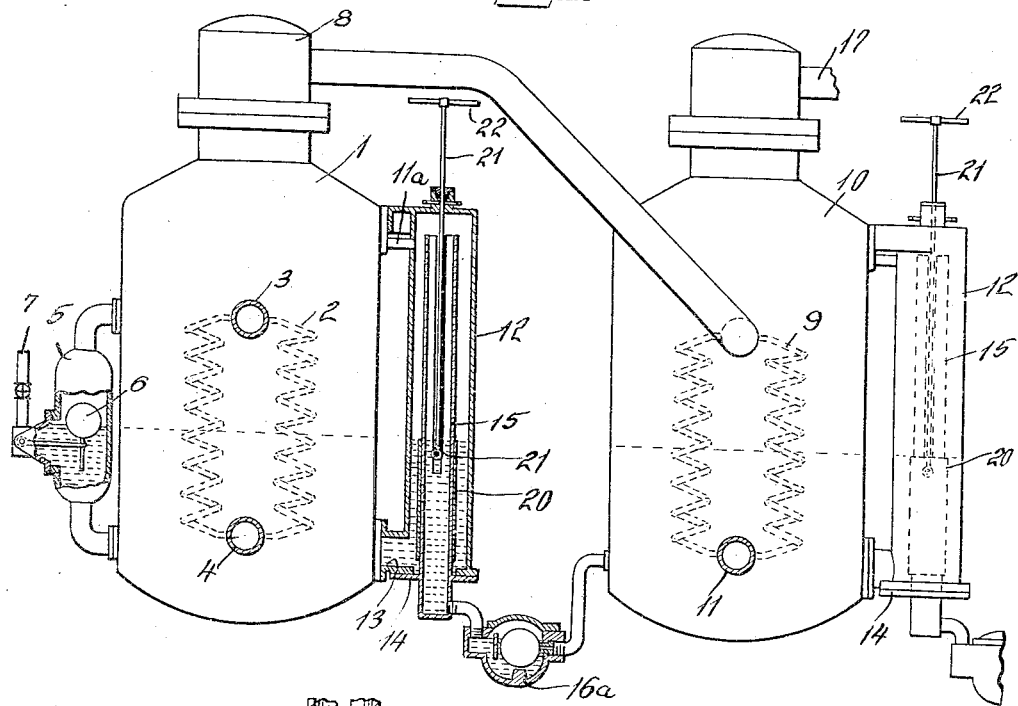
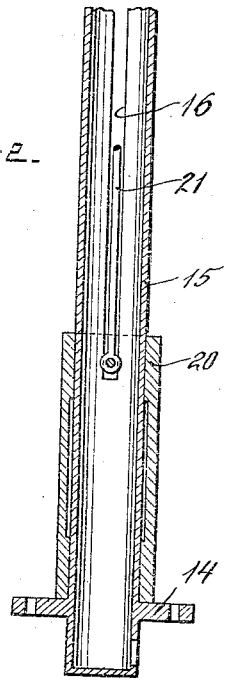
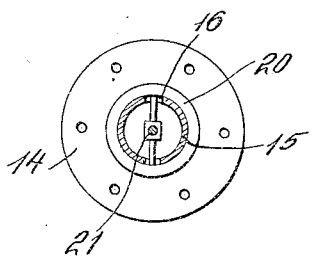
Inventor
William H. Ripley
By his Attorneys
Jennie Davis Marvin & Edmonds

UNITED STATES PATENT OFFICE.

WILLIAM HENRY RIPLEY, OF BROOKLYN, NEW YORK, ASSIGNOR TO THE GRISCOM-RUSSELL COMPANY, A CORPORATION OF DELAWARE.

WEIR-OVERFLOW FOR EVAPORATORS.

1,361,905.  Specification of Letters Patent.  Patented Dec. 14, 1920.

Application filed May 17, 1917. Serial No. 169,371.

*To all whom it may concern:*

Be it known that I, WILLIAM H. RIPLEY, a citizen of the United States, residing at #541 Lincoln Place, Brooklyn, N. Y., in the county of Kings, State of New York, have invented certain new and useful Improvements in Weir-Overflows for Evaporators; and I do hereby declare the following to be a full, clear, and exact description of the invention, such as will enable others skilled in the art to which it appertains to make and use the same.

This invention relates to evaporators, particularly of the multiple effect type, and has for its object to provide an evaporator system of this type in which the liquid level in the several effects is automatically maintained without the use of separate float valves or similar apparatus liable to be deranged and get out of order, particularly by an accumulation of scale.

It has been the practice for many years to maintain the desired liquid level in evaporators by using a float feed control having the liquid in the feed line at a higher pressure than in the evaporator, the flow of water being regulated by means of a float-controlled valve either in the shell or in an external chamber communicating with the shell.

Evaporators are very largely used with water having scale-forming properties for the express purpose of providing distilled water free from these properties for boiler use, and it has been found that the successful operation of the float feed valves and similar valves of this character is materially interfered with by the accumulation of scale on the valve seat which, if not frequently cleaned, renders the valve inoperative.

In a single evaporator having but one control valve, the scaling may be taken care of without stopping the operation of the evaporator by making the valve seats removable and providing an auxiliary hand-controlled feed valve. The evaporator may be put upon the manually controlled feed pipe by suitable cutout valves and the apparatus so controlled without too great labor while the valve seats are being cleaned and replaced. In large installations, however, including a number of shells in series, particularly when arranged for multiple effects, an effective manual control is difficult and if any one float valve is rendered inoperative by the accumulation of scale the entire plant must be shut down.

In the improved evaporator system of the present application the water to be evaporated is fed to the first shell only through the float feed valve, the water level in the succeeding shells of the series being automatically maintained by a novel overflow connection comprising no parts of a character to be rendered inoperative or ineffective by the accumulation of scale. By means of the invention of the present application a large evaporator plant of any size desired may be maintained in operation and successfully controlled with as little labor as a small plant comprising a single unit.

In the accompanying drawings I have illustrated an embodiment of my invention showing an arrangement of shells which may be indefinitely multiplied for obtaining a large output of distilled water with but one feed control valve.

In said drawings,

Figure 1 is an elevational view partly in section of a portion of a multiple effect evaporator system containing my invention; and Figs. 2 and 3 are detail views of the overflow connection which will be later described.

Referring to the drawings, 1 indicates the shell of the first evaporator of the system which is shown as of the multi-coil type now in wide use. Such evaporators comprise an exterior shell to which the impure water to be evaporated is delivered, and a bank of coils or tubing through which steam from the boiler is circulated to supply the necessary heat. The coils are indicated diagrammatically at 2 as connected to suitable upper and lower manifolds 3 and 4, respectively, through which steam is circulated from a source not shown. The water to be evaporated is fed to the shell 1 of the evaporator through a float feed valve of any approved type, here shown as consisting of a supplementary feed chamber 5 containing a float 6 adjustably connected to the lever of the inlet valve at the juncture of the feed line 7 with the feed chamber, whereby the water may be maintained at different levels by lengthening or shortening the float connection.

The feed chamber is connected at its upper and lower ends to the interior of the shell so that the water in the feed chamber will be at the same pressure as in the evaporator. It will be understood that the water in the feed line is maintained at a greater pressure than the working pressure of the evaporator so that water will always be fed into the evaporator shell whenever the level falls, to thereby maintain the water at the predetermined level, regardless of the pressure.

The shell 1 is provided with a separator head 8 of any approved type for separating the entrained water from the vapor generated in the evaporator or other suitable outlet for the vapor, and the vapor is passed from the head of the first shell 1 of the series to the coils 9 of the shell 10 of the second unit. From the lower or delivery manifold of the coils the condensed vapor will be passed through the outlet opening 11 to the storage tank or other point for using or storing the distilled water. The second unit is identical with the first except that instead of feeding the water to be evaporated to it directly from the feed line through a float valve the water is supplied to the shell of the second evaporator from the shell of the first through the overflow regulator forming the essential element of my invention.

This overflow regulator in the preferred embodiment of the invention selected for illustration, comprises a vertical cylinder or drum 12 attached to the side of the shell 1. The cylinder is closed at its upper end except for a small pressure equalizing passage 11$^a$ and is connected to the interior of the shell 1 at the base of the shell by means of a pipe 13 so that the water will stand in the drum 12 at the same level as in the shell. The lower end of the cylinder 12 is closed by the flange 14 of an inner stand pipe 15 which extends to near the top of the drum and is provided on two opposite sides with longitudinal slots 16 through which the water in the cylinder can overflow into the stand pipe. The slots form in effect weirs, that is, the quantity of water overflowing will bear a direct relation to the depth of water at the weir and by making the notch or slot narrow in proportion to the total circumference of the stand pipe, the normal water level may be several inches above the bottom of the slot, without making the overflow too rapid.

The water which overflows into the stand pipe from the drum is fed to the shell 10 of the second unit through a steam trap 16$^a$ of a construction not to be materially affected by scale or deposit, here shown as a ball trap which permits a continuous flow of liquid against any back pressure less than the pressure on the feed side of the trap, but closes against the passage of steam or vapor in the event that the liquid in the stand pipe should become exhausted.

The shell of the second unit is provided also with a separator head or other outlet from which the vapor may be passed to a suitable condenser, if a two-effect evaporator is employed. If, however, further units are to be utilized, the delivery pipe 17 of the second unit will be connected to the manifold coils of a third unit in identically the same manner as the separator of the first unit is connected to the coils of the second unit. The water to be evaporated in the third unit will be delivered thereto through an overflow feed 18 in all respects identical with the overflow feed of the first shell. If further effects are used each additional unit may be connected to the preceding one in the same manner, the coils of each unit being heated by the vapor from the preceding unit and the water to be evaporated being delivered through an overflow feed.

It is practicable to evaporate the water only to a certain degree of concentration before discharging so that all the impurities may be carried off in the liquid and in order to automatically effect the discharge and at the same time maintain the proper water level in the last unit of the system, the "blowdown" or outlet pipe is connected to the shell of the last unit through an overflow connection and trap similar to those employed between the shells of the successive units.

I preferably provide attachments for the overflow connections of the system whereby the level of the overflow may be adjusted to any desired point within a wide range. The adjusting attachment consists of a sleeve 20 having a loose sliding fit on the stand pipe 15, the sleeve being provided near its top edge with a cross bolt working in the slots 16 of the stand pipe to which is attached a vertical rod 21 projecting through the top wall of the drum through a suitable stuffing box or other packed joint provided with a handle 22 by means of which it may be raised to the desired height. The sleeve may be locked in the desired position by set screws in the collar of the stuffing box or other suitable means.

The operation of the device will now be described. It will be assumed that the feed line is of sufficient size and the water is delivered to it under sufficient pressure to maintain the level in the first shell high enough to provide the necessary rapidity of overflow to supply liquid to all the succeeding shells. The coils of the first evaporator are connected to a suitable boiler or other steam supply and the heated coils vaporize a portion of the water in the first shell, the vapor being discharged through the separator head to the coils of the second shell. A portion of the water from the first shell constantly overflows through the slots of the stand pipe 16 and passes to the second shell at a rate determined by the level maintained in the first shell. If the level maintained by the float feed is say three inches above the bottom of the slot the amount of water constantly delivered to the second shell will be determined by the area of the submerged portion of the slot and will not be affected by the degree of difference in pressure of the first and second shells. So long as the pressure is less in the second shell this quantity should be the proper quantity for the normal rapidity of operation of the succeeding units of the plant. Should the water level in the first shell drop through failure of pressure on the feed line, or a sudden increase of steam pressure to the coils, or for any other reason, the overflow to the second shell ceases, then the steam trap will cut off through the action of the pressure from the first shell, thus allowing the water level in the first shell to build up until the normal level is reached.

The continued evaporation from the second shell while the feed is cut off as described will lower the water level in the second shell which in turn will reduce the rate of overflow to the succeeding units, if there be any, and will finally reduce the overflow to the "blowdown" or discharge pipe so that the continued feed to the first shell will restore the normal level to all the units.

On the other hand, if for any cause the rate of flow to the first shell is abnormally large, or the rate of evaporation decreases, the water level in the shell and the drum of the overflow connection will rise and increase the rate of overflow through the weir slots and cause a more rapid feed to the shell of the second unit and so on, eventually increasing the rate of discharge through the blowdown, thus taking care of the surplus water fed until the feed to the first shell becomes normal.

By means of my invention an entire battery of evaporator units may be supplied with the liquid to be evaporated through a single feed valve which may readily be kept clean by providing two duplicate feed valves to be used alternately; the second valve may be merely an auxiliary hand-controlled feed valve to be used only while the float valve is being cleaned so the evaporator plant may be maintained in continuous operation with only occasional attention.

The successive feed connections between the units of the evaporator system will automatically maintain the liquid level in each unit at points varying through a range of but a few inches above the bottom of the slot, regardless of variations in the steam pressure supplied to the first unit of the system.

It will be noted that the slotted tube 15 terminates at an appreciable distance below the top of the drum 12, providing an unobstructed discharge from the evaporator shell equal to the diameter of the tube 15 should the liquid level in the shell rise above the top of the tube. The top of the tube is well above the normal working liquid level and the "spill-over" will not occur during ordinary operation. Should, however, the float feed valve fail to work and permit a continuous feed of the full capacity of the feed line, the liquid level can not rise much above the top of the tube 15 as the spill-over will take care of all the surplus feed and prevent further rise of the liquid level, thereby eliminating the possibility of filling the evaporator shell and flooding the system with the impure water or other liquid. The excessive feed to the other units of the system will merely have the effect of raising the liquid level in the several shells until the overflow is equal to the feed with a final discharge of the surplus through the blowdown.

The effect of the adjusting sleeve 20 is to close the lower part of the slot so that the top edge of the sleeve forms the effective bottom of the slot and thereby varies the level of the overflow. With the adjustable sleeve the evaporator plant is rendered more flexible so that it will operate efficiently under more widely varying conditions of output, steam pressure, etc.

The quantity of the blowdown and consequently the degree of concentration of the waste liquid may be regulated by adjusting the sleeve 20 of the first unit only of the system. The float feed valve maintains a predetermined liquid level regardless of the amount of overflow, hence the quantity of water fed to the system will be varied directly by the adjustment of the sliding sleeve of the first shell. If it is desired to reduce the quantity of blowdown the sliding sleeve will be raised in the overflow of the first shell. With the overflows of the succeeding shells unchanged the water levels in all the shells will remain about the same and the quantity of liquid evaporated will be substantially the same with a consequent reduction in the amount of the blowdown or discharge. It will be noted that the sliding sleeve 20 is of less height than the slotted portion of the tube 15 so that when the sleeve is sufficiently elevated its lower edge will uncover the lower end of the slot, providing an additional overflow orifice which is useful under certain special conditions of operation.

Instead of connecting the several units of the evaporator system so that each succeeding unit acts as a condenser for the vapor of the preceding units to thereby secure a multiple effect evaporation, each unit may be separately connected to the steam line, but with their shells connected in series through the wier overflow connection, the operation so far as the feed of the liquid to be evaporated is concerned, being obviously the same. Or, the several units may be connected in pairs for a double effect evaporator plant with one unit of each pair connected directly to the steam line. Or any other arrangement of the coil connections may be made as best suits the particular installation.

Instead of using the steam traps between the several units and for the blowdown, very satisfactory results may be had with simple check valves to prevent back pressure from one shell to the preceding one.

The narrow slot overflow connection disclosed in this application is particularly useful in evaporators and apparatus of that character where the liquid is in more or less violent agitation during the operation of the apparatus. With the narrow slot overflow disclosed, momentary variations in the liquid level, even of considerable extent, will make little difference in the quantity of the overflow, whereas with a large overflow opening each abnormal rise of the liquid level would cause a large quantity of the liquid to "spill" through the opening so that the quantity of overflow would vary with the degree of agitation in the liquid and not with the average water level. The narrow slot overflow is also particularly useful on shipboard where the liquid in the apparatus to be regulated is agitated by the motion of the ship.

In the preceding description and following claims we have used the term "slot" in a generic sense to mean an elongated opening or its equivalent, without regard to configuration. For instance, a V shaped slot or notch might be used, or a series of perforations at different levels in the wall of the stand pipe would have the effect of regulating the overflow, though perhaps not as successfully as the particular configuration of slot illustrated in the drawing.

I have illustrated and described my overflow feed connection as applied to its preferred use on an evaporator plant for scale forming water, but it is obvious that it may be used with advantage in evaporators for other purposes and in any apparatus where it is desired to maintain predetermined liquid levels or definite relative levels in connected apparatus.

I claim:

1. In apparatus of the class described, a liquid container means for continuously feeding liquid thereto in excess quantity and an overflow discharge therefor comprising a discharge line, and a wall separating said discharge line from said container, said wall having a constantly open narrow slot.

2. In apparatus of the class described, a container for liquid under pressure, means for continuously feeding liquid thereto in excess quantity, a constant discharge outlet therefor comprising a discharge chamber open to the pressure of the liquid in the container, a wall separating said chamber from said container and a narrow permanently open vertical slot in said wall, the lower end of said slot being slightly below the level desired to be maintained in said container.

3. In apparatus of the class described, a container for liquid under pressure, means for continuously feeding liquid thereto in excess quantity, a discharge outlet therefor comprising a vertical pipe projecting upwardly through the liquid in the container to a point above the level desired to be maintained, a narrow vertical slot in the wall of said pipe having its lower end below the level desired to be maintained, said pipe having a discharge opening connected to it at a point outside of the said container.

4. In apparatus of the class described the combination of two units each comprising a liquid container, and means for regulating the flow of liquid from one container to the other embodying a passage-way connecting said containers and a wall in said passageway, said wall having a narrow vertical slot with the bottom of the slot slightly below the liquid level in the first container, the slot extending above said liquid level and means for continuously feeding the liquid to the container of the first unit in an excess quantity.

5. In apparatus of the class described, the combination of two units each comprising a liquid container and means for regulating the flow of liquid from one container to the other embodying an intermediate container provided with a partition, connections on one side of said partition with one of said containers and on the other side of said partition with said other container, a narrow vertical slot in said partition extending from a point below the normal liquid level in the first container, to a point well above said liquid level and means for continuously feeding the liquid to the container of the first unit in an excess quantity.

6. In apparatus of the class described the combination of a plurality of units each comprising a liquid container and means for maintaining predetermined liquid levels in said containers, said means embodying a float feed valve for the first container and an intermediate chamber between adjacent containers, said chamber having a partition with the connections to the said containers on opposite sides of said partition, said partition having a narrow slot extending from a point somewhat below the level to be maintained by said float feed valve to a point well above said level.

7. In apparatus of the class described the combination of a plurality of units each comprising a liquid container and means for maintaining predetermined liquid levels in said containers, said means embodying a float feed valve for the first container and an intermediate chamber between adjacent containers, said chamber having a partition with the connections to the said containers on opposite sides of said partition, said partition having a narrow slot extending from a point somewhat below the level to be maintained by said float feed valve to a point well above said level, and a discharge opening for the last container consisting of a vertical slot in a wall of said container, said slot extending from a point somewhat below the level maintained by the feed connection to said container to a point above such level.

8. In apparatus of the class described the combination of a plurality of units each comprising a liquid container and means for maintaining predetermined liquid levels in said containers, said means embodying a float feed valve for the first container and an intermediate chamber between adjacent containers, said chamber having a partition with the connections to the said containers on opposite sides of said partition, said partition having a narrow slot extending from a point somewhat below the level to be maintained by said float feed valve to a point well above said level, a discharge regulator for the last container similar to the feed connection between the units of the system.

9. In an evaporator system the combination of a plurality of units, each unit comprising a container for the liquid to be evaporated and heating coils in said container for evaporating the liquid, a feed valve for regulating the flow of liquid to be evaporated to the first said unit and an overflow connection between the units of the system, said overflow connection comprising an intermediate chamber having a partition, the chamber on one side of the partition being connected to the first unit below the liquid level, an elongated discharge orifice in said partition, and connections between the opposite sides of said partition and the succeeding unit, and a steam trap in said connections.

10. In an evaporator system the combination of a plurality of units, each unit comprising a container for the liquid to be evaporated and heating coils in said container for evaporating the liquid, a feed valve for regulating the flow of liquid to be evaporated to the first said unit and an overflow connection between the units of the system, said overflow connection comprising an intermediate chamber having a partition, the chamber on one side of the partition being connected to the first unit below the liquid level, an elongated discharge orifice in said partition, and connections between the opposite side of said partition and the succeeding unit, and a steam trap in said connections, a discharge regulator for the last unit of the system consisting of an overflow connection similar to the connection between the units with a steam trap in the discharge pipe.

11. In an evaporator system the combination of a plurality of units, each unit comprising a container for liquid to be evaporated, means for regulating the flow of liquid from one container to the next succeeding container comprising a passageway leading into the second container of the connected pair, said passageway having a vertical elongated orifice in its wall in permanently open communication with the interior of the first container of the connected pair.

12. In an evaporator system the combination of a plurality of units, each unit comprising a container for liquid to be evaporated, means for regulating the flow of liquid from one container to the next succeeding container comprising a passageway leading into the second container of the connected pair, said passageway having a vertical elongated orifice in its wall in permanently open communication with the interior of the first container of the connected pair, and means for maintaining a liquid level in said first container above the bottom and below the top of said elongated orifice.

13. In an evaporator system the combination of a plurality of units, each unit comprising a container for liquid to be evaporated, means for regulating the flow of liquid from one container to the next succeeding container comprising a passageway leading into the second container of the connected pair, said passageway having a vertical elongated orifice in its wall in permanently open communication with the interior of the first container of the connected pair, and means for varying the height of the bottom of said orifice.

14. In an evaporator system the combination of a plurality of units, each unit comprising a container for liquid to be evaporated, means for regulating the flow of liquid from one container to the next succeeding container, comprising an intermediate container in permanently open communication with the interior of the first container of the connected pair, a stand pipe in said intermediate container with its interior connected to the second container of the connected pair, an elongated slot in the wall of said stand pipe and a sleeve adjustable on said stand pipe whereby the upper edge of the sleeve forms the effective bottom of said slot.

In testimony whereof I affix my signature.

WILLIAM HENRY RIPLEY.